United States Patent
Keith et al.

(10) Patent No.: US 6,760,545 B1
(45) Date of Patent: Jul. 6, 2004

(54) METHOD AND CAMERA FOR IMAGE CAPTURE

(75) Inventors: Laura E. Keith, Acton, MA (US); Norman D. Staller, Beverly, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 10/662,598

(22) Filed: Sep. 15, 2003

(51) Int. Cl.⁷ .............................................. G03B 15/05
(52) U.S. Cl. ...................................................... 396/61
(58) Field of Search ........................ 396/61, 89, 65–70, 396/168, 170

(56) References Cited

U.S. PATENT DOCUMENTS 5,960,217 A * 9/1999 Goto ............................ 396/65

* cited by examiner

Primary Examiner—W. B. Perkey

(57) ABSTRACT

A camera and method for image capture at less than a nominal minimum focus distance provide for initiating image capture through a variable aperture at a first aperture size, collecting a predetermined amount of ambient scene light during image capture, initiating closing of the variable aperture, and illuminating a flash unit during closing of the variable aperture at a predetermined restricted second aperture size.

20 Claims, 3 Drawing Sheets

METHOD AND CAMERA FOR IMAGE CAPTURE

FIELD OF THE INVENTION

The present invention generally relates to close-up image capture, and in particular to fill flash, close-up image capture.

BACKGROUND OF THE INVENTION

The pervasive use and availability of cameras provides commercial advantage to cameras having improved performance and reduced cost. Camera costs can be reduced in the area of imaging optics, but at the cost of optical performance. For example, limiting near-field focusing capability can reduce manufacturing costs, but at the cost of creating blurry images of objects located at less than a nominal minimum focus distance from the camera. Thus, it would be advantageous to improve the near-field focusing qualities of cameras having less expensive, fixed focal length optics by substantially reducing the image blurriness of such objects.

SUMMARY OF THE INVENTION

Accordingly, one form of the present invention provides a method for image capture at less than a nominal minimum focus distance of a camera, comprising the steps of selecting a close up operational mode for the camera, initiating image capture through a variable aperture at a first aperture size, collecting a predetermined amount of ambient scene light during image capture, initiating closing of the variable aperture, and illuminating a flash unit during closing of the variable aperture at a predetermined restricted second aperture size corresponding to the close up operational mode.

The step of selecting may include determining whether an object to be photographed is located at less than a nominal minimum focus distance of the camera and also whether an object to be photographed is located within one of a plurality of ranges less than the nominal minimum focus distance. The step of illuminating may include using a separate predetermined restricted second aperture size corresponding to each of the plurality of ranges. The step of collecting may include using a separate predetermined amount of ambient scene light corresponding to each of the plurality of ranges. The step of determining may include performing a range finding function with the camera.

The step of collecting light may be performed with the variable aperture at a maximum aperture size. The step of illuminating may include detecting the predetermined restricted aperture size.

Another form of the present invention provides a camera, comprising an image capture system having a nominal minimum focus distance including a variable aperture and an exposure control system operatively coupled to the image capture system and adapted to use a fill flash function to capture images at less than the nominal minimum focus distance.

The exposure control may be adapted to collect a predetermined amount of ambient scene light during image capture, to initiate closing of the variable aperture, and illuminate a flash unit during closing of the variable aperture at a predetermined restricted aperture size. The variable aperture may use a maximum aperture size for collecting the predetermined amount of ambient scene light.

The exposure control system may include a ranging system adapted to determine whether an object to be photographed is located at less than a nominal minimum focus distance of the camera or whether an object to be photographed is located within one of a plurality of ranges less than the nominal minimum focus distance. The exposure control system may be adapted to illuminate the flash unit at a different predetermined restricted second aperture size corresponding to each of the plurality of ranges. The exposure control system may be adapted to collect a separate predetermined amount of ambient scene light corresponding to each of the plurality of ranges.

The image capture system may include a detector operatively connected to the exposure control system and adapted for sensing the predetermined restricted aperture size of the variable aperture. The variable aperture is a scanning aperture shutter.

Yet another form of the present invention provides a camera for capturing images at less than a nominal minimum focus distance, comprising an image capture system having a nominal minimum focus distance including a variable aperture; and an exposure control system operatively coupled to the image capture system and including a photocell adapted to sense ambient scene light during image capture. The exposure control is adapted to perform image capture with ambient light at a first aperture size, sense a predetermined amount of ambient scene light during image capture, initiate closing of the variable aperture, and illuminate a flash unit during closing of the variable aperture at a predetermined restricted second aperture size.

The may include a ranging system adapted to determine whether an object to be photographed is located within one of a plurality of ranges less than the nominal minimum focus distance, wherein the exposure control system is adapted to illuminate the flash unit at a different predetermined restricted second aperture size and to collect a separate predetermined amount of ambient scene light corresponding to each of the plurality of ranges.

BRIEF DESCRIPTION OF THE DRAWINGS

The present invention is illustratively shown and described in reference to the accompanying drawings, in which.

DETAILED DESCRIPTION OF THE DRAWINGS

Figure 1:
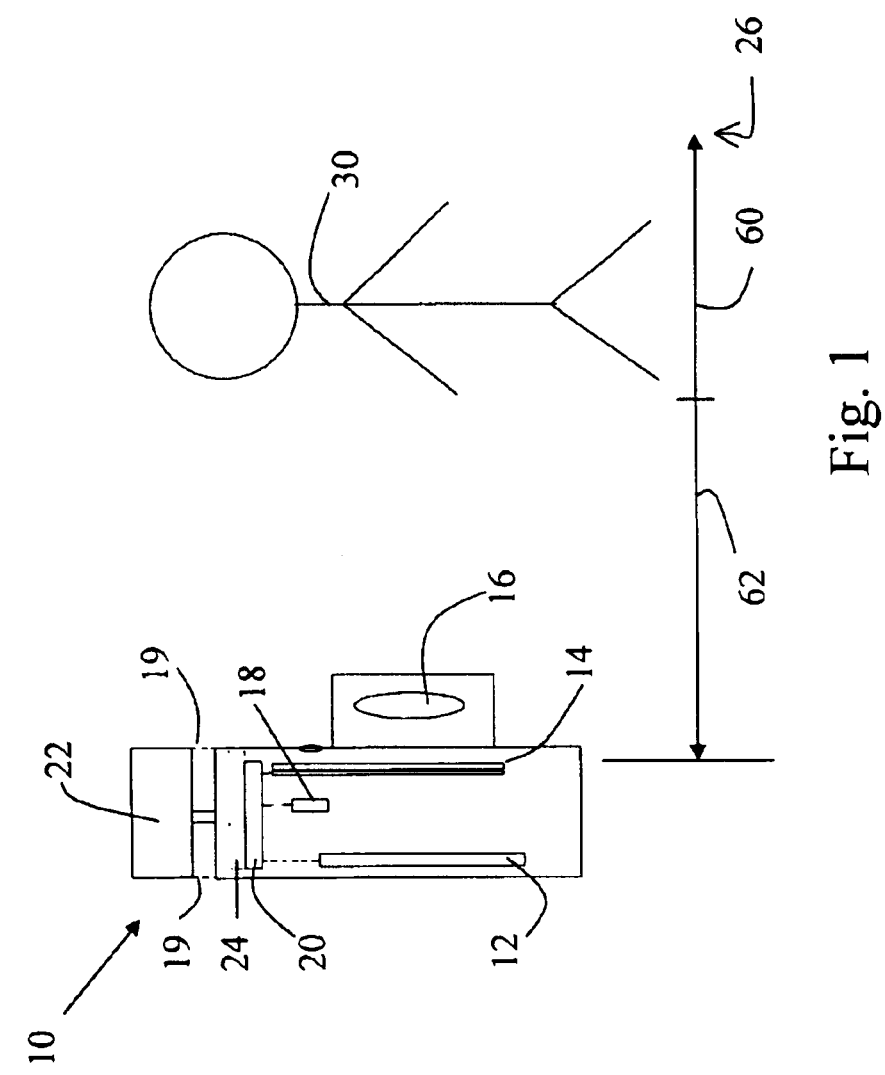
FIG. 1 is a diagrammatic side view of a camera constructed in accordance with one embodiment of the present invention and shown as it would be used for practicing the present invention.

FIG. 1 shows a camera 10 generally including an image capture medium 12, a variable aperture shutter 14, imaging optics 16, a photocell 18, an exposure control system 20, and a flash unit 22. Camera 10 may optionally include a range finding device 24.

The combination of image capture medium 12, variable aperture shutter 14 and imaging optics 16 forms an image capture system. Image capture medium 12 may be any suitable medium, such as silver halide film or electronic semiconductor. Shutter 14 may be any suitable device having an aperture size which may be varied over the course of an individual image capture. One suitable example is known as a scanning aperture shutter.

Imaging optics 16 may be any fixed or variable focus optics, which focus an image through variable aperture shutter 14 on to image capture medium 12. The arrangement of imaging optics 16 in camera 10 typically causes camera 10 to have a nominal minimum focus distance 26, which typically must be exceeded during image capture to avoid blurring of the resulting image.

Photocell 18 is oriented to sense light levels received from an image scene. In one known arrangement, photocell 18 is located behind variable aperture shutter 14 and receives image light through a separate variable aperture in shutter 14. In this manner, photocell 18 receives an amount of scene light which is analogous to the amount of scene light received by image capture medium 12. This known arrangement allows real time monitoring of light received during image capture. An example of such a multiple aperture shutter is described in reference to FIG. 3.

In typical fashion, exposure control system 20 is responsive to photocell 18 and controls variable aperture shutter 14 to provide proper exposure light for capturing images on medium 12. Exposure control system 20 also controls flash unit 22 for the purpose of flash image capture and fill flash assisted image capture.

Camera 10 is shown as it would it be used for image capture, in accordance with the present invention, of a subject 30 to be photographed against a background 32. As shown, subject 30 is located at a distance from camera 10, which distance is less than the nominal minimum focus distance 26 of camera 10. In order to provide a properly focused image of subject 30 and background 32, exposure control system 20 is adapted to use a fill flash function to simultaneously balance lighting and focus of the image.

Figure 2:
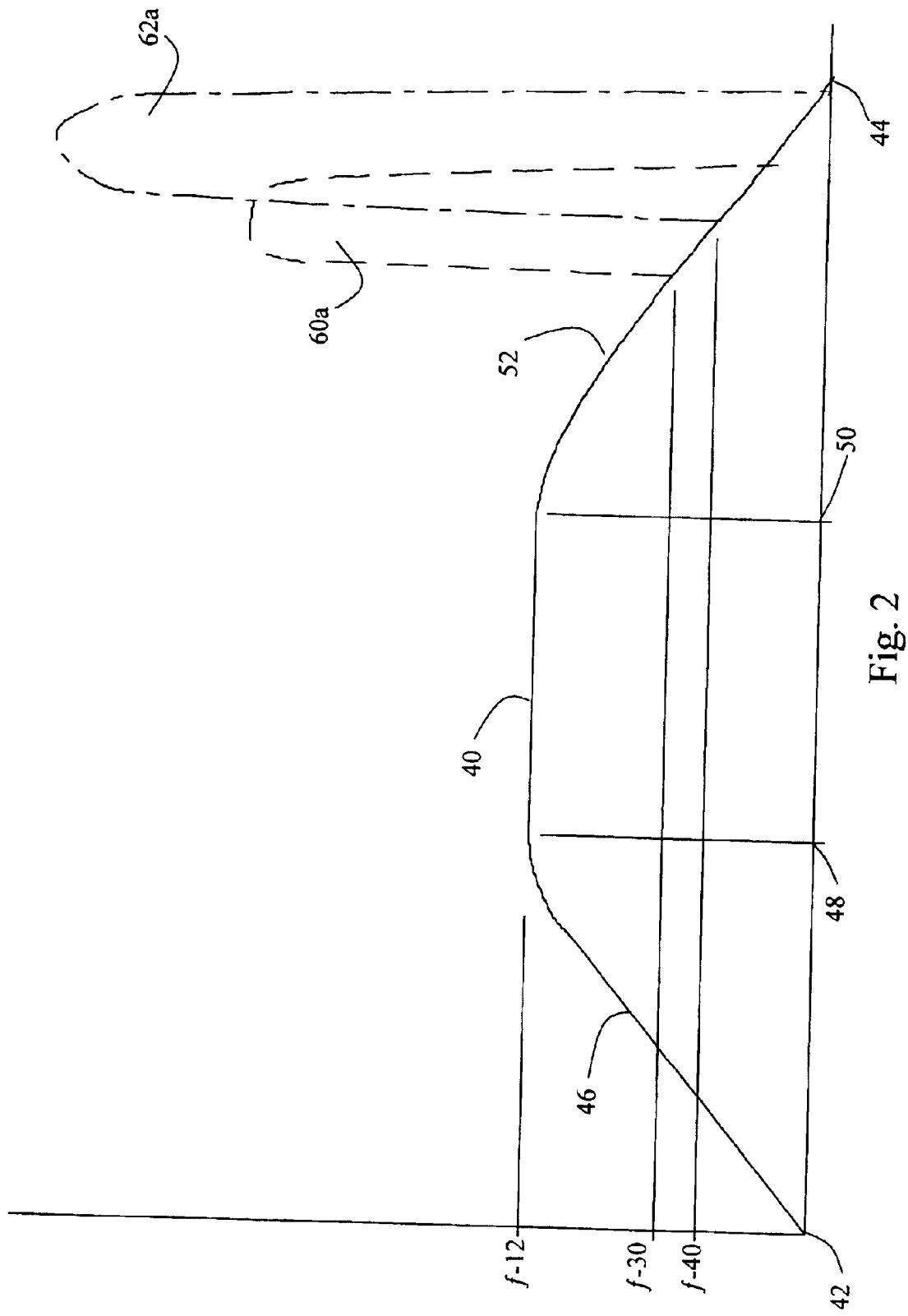
FIG. 2 is a graph indicating shutter aperture size and exposure light of the embodiment of FIG. 1, over the period of an image capture.

FIG. 2 demonstrates the manner in which exposure control system 20 performs a fill flash function to capture images at less than the nominal minimum focus distance 26 of camera 10. Curve 40 represents aperture size for a scanning aperture shutter from the initiation of image capture at 42 to full closure of the aperture at 44. The left axis of FIG. 2 represents aperture size and includes examples of possible aperture sizes indicated in f-stops. When image capture is initiated at 42 the aperture opening increases along slope 46 until it reaches a maximum value of f-12 at 48. During this time, photocell 18 is receiving an analogous amount of light, and its sensed value is being integrated over time to measure total exposure light. When the integrated value reaches a predetermined level at 50, closure of shutter 14 is initiated. Although the closure point 50 is shown herein as occurring after the maximum aperture point 48, closure point 50 may just as readily occur before maximum aperture point 48.

Aperture closure is indicated by the negative slope 52. When the aperture reaches a predetermined size during the shutter closing (f-30 for example), flash unit 22 is illuminated. In one embodiment, flash unit 22 may be quenched after a predetermined period. In another embodiment, flash unit 22 is quenched when sufficient reflected infrared energy is sensed with an infrared photocell. The amount of image light received as a result of flash illumination is generally represented by curve 60a. Although FIG. 2 combines curve 40 of aperture size and curve 60a of flash illumination to show their temporal relation, the values or areas of these curves are not intended to be proportional.

The total amount of image capture light used by camera 10 in this close-up mode of operation is thus a controlled mixture of ambient and fill flash light. The amount of ambient light used is measured in real time by photocell 18. The amount of fill flash energy used may be readily predetermined by either the principals of 'follow focus' flash control, or by real time sensing of infrared energy reflected from the image scene. The 'follow focus' method is known and takes into account the output characteristics (including power and time) of flash unit 22, the distance to the near-field subject 30 of less than the nominal minimum focus distance, and the aperture size during flash illumination.

The balance between ambient and fill flash light may be determined experimentally for each different camera design and will vary in response to the nominal minimum focus distance of each design. In the same manner that the nominal minimum focus distance will vary the light balance used for the present invention, the close-up range of operation may further be divided into a plurality of ranges less than the nominal minimum focus distance. For example, a camera having a nominal minimum focus distance 26 of six feet may have a first close-up range 60 (FIG. 1) of four to six feet and a second close-up range 62 of less than four feet. Ranges 60 and 62 may be differentiated by the aperture size used for flash illumination as represented in FIG. 2 by f-30 for range 60 and f-40 for range 62. Ranges 60 and 62 may further be differentiated by the balance of ambient and fill flash light. Thus range 60 might use an ambient light mix of approximately 75%, while range 62 might use an ambient light mix of approximately 50%.

This approach of using a restricted aperture size while illuminating objects at less than the nominal minimum focus distance reduces the angle of converging light rays for each image point, thus allowing greater deviation of the formed image from an image capture focal plane before blurring is perceived.

The present invention involves a close-up mode of camera operation which would be selectable over normal modes of operation. This selection may be made manually by an operator who chooses to photograph a subject 30 at less than the nominal minimum focus distance. This close-up mode may also be selected automatically by a range finding device 24 (FIG. 1) in camera 10. Range finding device 24, or manual selection, can also be used to differentiate between a plurality of ranges 60, 62 at less than the nominal minimum focus distance 26.

As mentioned, imaging optics may be fixed or variable, and range finding device 24 may thus support an auto focus function at greater than the nominal minimum focus distance, as well as close-up range identification.

Figure 3:
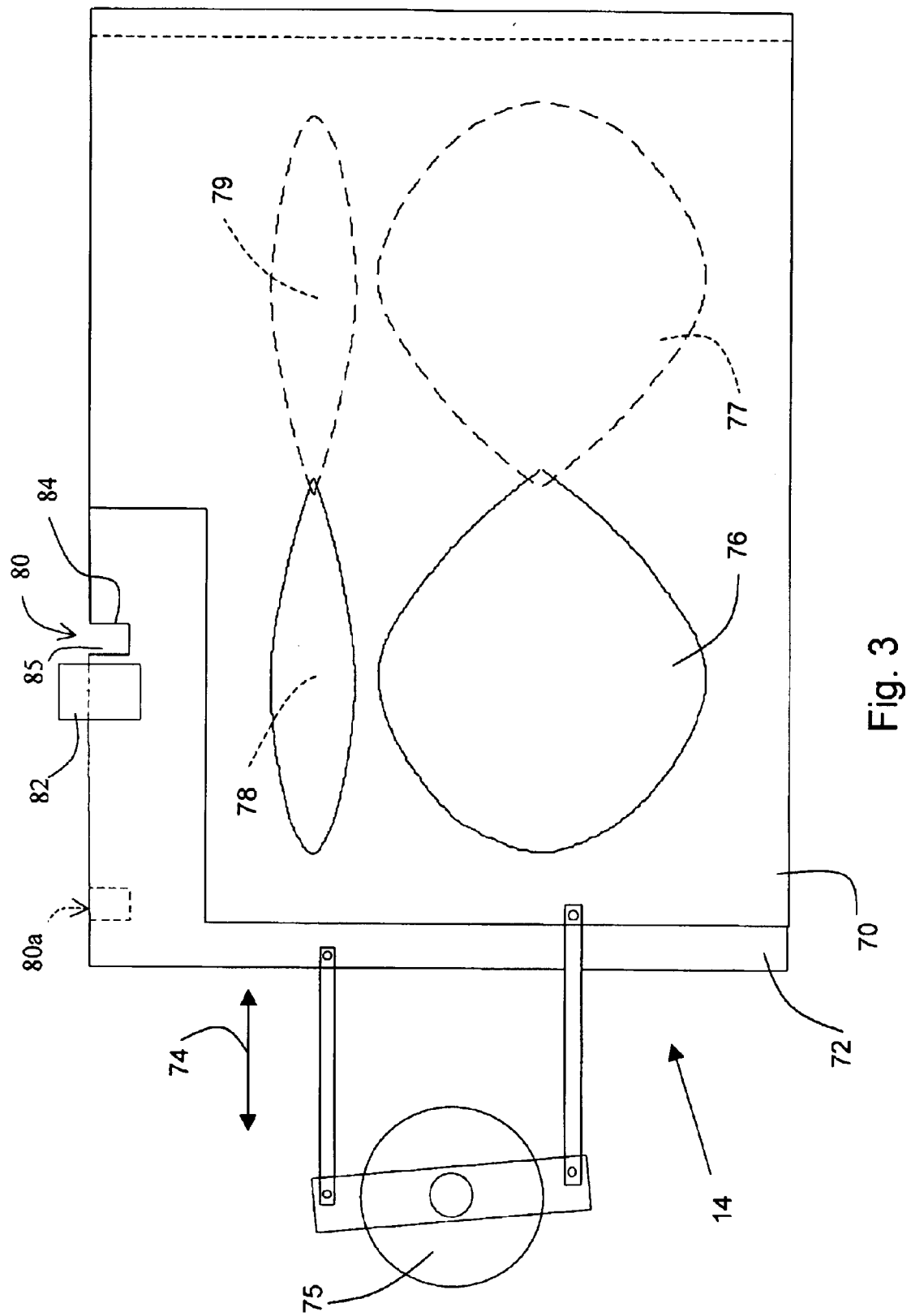
FIG. 3 is a front view diagram of a scanning aperture shutter constructed in accordance with the camera of FIG. 1.

FIG. 3 is a representational front view of one form of scanning aperture shutter 14, called a blade shutter, which may be used with the camera 10 (FIG. 1). Shutter 14 typically includes a pair of rigid shutter blades 70, 72, which are adapted for relative lateral movement in the direction of arrows 74 by means of an electromechanical actuator 75. Front shutter blade 70 includes apertures 76, 78, and rear blade shutter 72 includes apertures 77, 79, shown in phantom. Aperture pair 76, 77 are intended for image capture, and aperture pair 78, 79 are intended for exposing photocell 18 (FIG. 1) to incident image light energy.

The relative lateral movement of shutter blades 70, 72 causes aperture pairs 76, 77 and 78, 79 to progressively overlap and thereby increase the aperture size for incident light energy. The separate aperture pairs 76, 77 and 78, 79 are proportionately sized so that any relative positioning of shutter blades 70, 72 results in generally the same proportion of light energy emitted through aperture pairs 76, 77 and 78, 79. Thus, the amount of light energy sensed by photocell 18 generally represents the same proportion of the light energy emitted through aperture pair 76, 77, regardless of the position of shutter blades 70, 72. The art of constructing blade shutters is well developed and many variations from the art may be used with the present invention. Although lateral movement of shutter blades 70, 72. is described, alternative forms of movement, such as rotational, may be used. Likewise, relative shapes and sizes may be varied in accordance with known methods.

The preferred approach for controlling flash illumination for purposes of the present invention is to physically sense the position of variable aperture shutter 14. This approach substantially eliminates the variable factors of shutter movement such as friction and actuator power. For this purpose, shutter blade 72 includes a notch 80 and a fixed position, optical interrupt detector 82. Notch 80 generally includes a leading edge 84 and a trailing edge 85. Please note that the labels 'leading' and 'trailing' are respective of the direction of movement of slot 80 during shutter closing for purposes of the present invention.

FIG. 3 shows shutter blades 70, 72 in a substantially closed position. When shutter 14 is opening, notch 80 will move to the left with respect to fixed detector 82 and might reach maximum aperture at position 80*a,* shown in phantom. During closure of shutter 14, slot 80 will move from position 80*a* to the right and past optical interrupt detector 82. Detector 82 will detect the precise passage of both leading edge 84 and trailing edge 85. In relation to the example of FIG. 2, leading edge 84 may be located at the aperture size F30, and trailing edge 85 may be located at the aperture size F40. Thus, a single notch 80 may be used for precise detection of two different aperture sizes for shutter 14, of course, separate notches may also be used.

The optical detector 82 and notch 80 may also be used by exposure control system 20 for additional functions. A light/dark trim feature may be added to the exposure control to change the F-Stop of flash illumination to allow more strobe light on the near field objects. Also, physical shutter performance may be monitored by measuring the timing of aperture opening.

Thus, the present invention provides a method and camera which are useful for capturing images at less than the nominal minimum focus distance of a camera. This enables the construction of cameras having less expensive optical systems while retaining close-up image quality. Such cameras are also smaller and lighter. This invention is applicable to both fixed focal length cameras and to variable focus cameras which still retain a limited nominal minimum focus distance. The exposure control of the present invention provides an image quality suitable for use with self developing film, which does not have the flexibility available from photo lab printing.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method for image capture at less than a nominal minimum focus distance of a camera, comprising the steps of:

selecting a close up operational mode for said camera;

initiating image capture through a variable aperture at a first aperture size;

collecting a predetermined amount of ambient scene light during image capture;

initiating closing of said variable aperture; and illuminating a flash unit during closing of said variable aperture at a predetermined restricted second aperture size corresponding to said close up operational mode.

2. The method of claim 1, wherein said step of collecting is performed with said variable aperture at a maximum aperture size.

3. The method of claim 1, wherein said step of selecting includes determining whether an object to be photographed is located at less than a nominal minimum focus distance of said camera.

4. The method of claim 3, wherein said step of determining includes determining whether an object to be photographed is located within one of a plurality of ranges less than said nominal minimum focus distance.

5. The method of claim 4, wherein said step of illuminating includes using a separate predetermined restricted second aperture size corresponding to each of said plurality of ranges.

6. The method of claim 4, wherein said step of collecting includes using a separate predetermined amount of ambient scene light corresponding to each of said plurality of ranges.

7. The method of claim 3, wherein said step of determining includes performing a range finding function with said camera.

8. The method of claim 1, wherein said step of illuminating includes detecting said predetermined restricted aperture size.

9. The method of claim 8, wherein said variable aperture is a scanning aperture shutter.

10. A camera, comprising:

an image capture system having a nominal minimum focus distance including a variable aperture; and an exposure control system operatively coupled to said image capture system and adapted to use a fill flash function to capture images at less than said nominal minimum focus distance.

11. The camera of claim 10, wherein said exposure control is adapted to collect a predetermined amount of ambient scene light during image capture, to initiate closing of said variable aperture, and illuminate a flash unit during closing of said variable aperture at a predetermined restricted aperture size.

12. The camera of claim 11, wherein said variable aperture uses a maximum aperture size for collecting said predetermined amount of ambient scene light.

13. The camera of claim 11, wherein said exposure control system includes a ranging system adapted to determine whether an object to be photographed is located at less than a nominal minimum focus distance of said camera.

14. The camera of claim 13, wherein said ranging system is adapted to determine whether an object to be photographed is located within one of a plurality of ranges less than said nominal minimum focus distance.

15. The camera of claim 14, wherein said exposure control system is adapted to illuminate said flash unit at a different predetermined restricted second aperture size corresponding to each of said plurality of ranges.

16. The camera of claim 14, wherein said exposure control system is adapted to collect a separate predetermined amount of ambient scene light corresponding to each of said plurality of ranges.

17. The camera of claim 11, wherein said image capture system includes a detector operatively connected to said exposure control system and adapted for sensing said predetermined restricted aperture size of said variable aperture.

18. The camera of claim 10, wherein said variable aperture is a scanning aperture shutter.

19. A camera for capturing images at less than a nominal minimum focus distance, comprising:

an image capture system having a nominal minimum focus distance including a variable aperture; and an exposure control system operatively coupled to said image capture system and including a photocell adapted to sense ambient scene light during image capture, wherein said exposure control is adapted to perform image capture with ambient light at a first aperture size, sense a predetermined amount of ambient scene light during image capture, initiate closing of said variable aperture, and illuminate a flash unit during closing of said variable aperture at a predetermined restricted second aperture size.

20. The camera of claim 19, further comprising a ranging system adapted to determine whether an object to be photographed is located within one of a plurality of ranges less than said nominal minimum focus distance, wherein said exposure control system is adapted to illuminate said flash unit at a different predetermined restricted second aperture size and to collect a separate predetermined amount of ambient scene light corresponding to each of said plurality of ranges.

* * * * *